United States Patent [19]

Blount

[11] 4,169,930

[45] Oct. 2, 1979

[54] PROCESS FOR THE PRODUCTION OF AMINO SILICATE COMPOUNDS AND THEIR CONDENSATION PRODUCTS

[76] Inventor: David H. Blount, 5450 Lea St., San Diego, Calif. 92105

[21] Appl. No.: 786,617

[22] Filed: Apr. 8, 1977

Related U.S. Application Data

[60] Division of Ser. No. 652,338, Jan. 26, 1976, Pat. No. 4,033,935, which is a continuation-in-part of Ser. No. 559,313, Mar. 17, 1975, Pat. No. 3,979,362, which is a continuation-in-part of Ser. No. 71,628, Sep. 11, 1970, abandoned.

[51] Int. Cl.$^2$ .............................................. C08G 77/04
[52] U.S. Cl. .............................. 528/38; 260/448.2 N; 260/448.2 E

[58] Field of Search ................. 260/448.2 N, 448.2 E; 528/38

[56] References Cited

U.S. PATENT DOCUMENTS

| 4,011,253 | 3/1977 | Blount | 260/448.2 E |
| 4,089,883 | 5/1978 | Blount | 260/448.2 E X |

Primary Examiner—Paul F. Shaver

[57] ABSTRACT

Silicic-amino compounds are formed by the chemical reaction of silicic acid with amino compounds in the presence of a suitable alkali at a suitably elevated temperature, and then by reacting the resultant compounds with an aldehyde, a condensation product is formed.

4 Claims, No Drawings

PROCESS FOR THE PRODUCTION OF AMINO SILICATE COMPOUNDS AND THEIR CONDENSATION PRODUCTS

CROSS-REFERENCE TO RELATED APPLICATIONS

This application is a division of U.S. Pat. application Ser. No. 652,338, filed Jan. 26, 1976, U.S. Pat. No. 4,033,938 which is a continuation-in-part of my copending application, Ser. No. 559,313, filed Mar. 17, 1975 U.S. Pat. No. 3,979,362, which is a continuation-in-part of my earlier U.S. patent application, Ser. No. 71,628, filed Sept. 11, 1970, now abandoned.

BACKGROUND OF THE INVENTION

This invention relates in general to silicic acid compounds and, more specifically, to a process for producing novel silicic amino compounds and their condensation products.

The silicic acid may be produced by any of the well known processes, such as chemically reacting a solution of sodium metasilicate with a mineral acid to produce silicic acid gel. Various silicic acids may be used, such as silicic acid gel, orthosilicic acid, metasilicic acid, polysilicoformic acid, orthosilicoformic acid, silicoformic acid and monosilandiol.

Amino silicate compounds are useful as intermediates for the production of other compounds by further suitable reactions. Typically, they may be used in the production of prepolymers, polymers, resins, as an additive or a reactant. Also, they may be used in coating agents, adhesives, impregnants, molding powder, paints, varnishes, laminates, or their manufacture, and may be reacted with other polymerizing compounds.

The silicic-amino aldehyde condensation polymers are useful as coating agents, adhesives, impregnants, molding powder, paints varnishes, laminates or their manufacture, and may be reacted with other polymerizing compounds.

SUMMARY OF THE INVENTION

I have discovered that silicic acid will react chemically with an amino compound in the presence of a suitable alkali catalyst at a temperature just above the melting point of the amino compound. The amino compounds are basic and will react chemically with silicic acid without an alkali catalyst, but the reaction is enhanced by a suitable alkali catalyst. The amino compound will react with silicic acid in the ratio of 1:1 mols or 2:1 mols. While the specific reaction which takes place is not fully understood, typical reactions which are believed to occur take place as follows:

Orthosilicic acid is theorized to react with urea as follows:

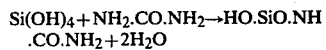

Metasilicic acid is theorized to react with urea as follows:

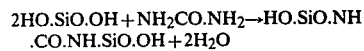

Reactions with other amino compounds are expected to be similar to these, so that the mol ratios of the reactants should be selected accordingly.

Amino silicate compounds are theorized to react with an aldehyde to form condensation products as follows:

Urea silicate is theorized to react with formaldehyde as follows:

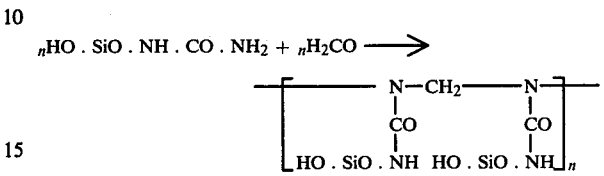

DETAILED DESCRIPTION OF THE INVENTION

Any suitable amino compound may be used in my novel process. Typical amino compounds include urea, thiourea, melamine, quanidine, saccharin, propyl urea, butyl urea, benzene and tolune sulfonamide, ammeline, aliphatic diamines and other alkyl-substituted ureas.

Various aldehydes may be used, such as formaldehyde, acetaldehyde, butyaldehyde, chloral, acrolein, furfural and hexamethylene tetramine. The aldehyde ratio may vary from 1:1 to 5:1 when reacting with an amino silicate, depending on the methyl groups desired.

The chemical reaction between silicic acid and an amino compound may take place in a basic, neutral or acidic pH, but it is enhanced by a basic pH. The chemical reaction between an amino silicate and an aldehyde may take place in a basic, neutral or acidic pH, but is enhanced by a basic or an acidic pH. The acidic catalysts most commonly used are sodium hydrogen sulfate, sulfuric acid, hydrochloric acid, formic acid, acetic acid, and acid esters, such as acid alkyl phosphates. The most common basic catalyst is sodium carbonate, but other basic compounds may be used, such as calcium hydroxide, sodium hydroxide, potassium carbonate, potassium hydroxide, ammonia and alkanolamine. The alkali may act as a catalyst directly, or it may react slightly with one or the other of the primary reactants. From about 1 to 10 weight percent catalyst, based on the weight of silicic acid and amino compound used, gives best results.

The resin solutions of poly (aldehyde amino silicate) may be converted to a fully hardened state by prolonged heating. Plasticizers may be used to improve flexibility and adhesiveness. Latent catalysts may be used to catalyze the final conversion of the molding powder from the initial stages of resin formation to the infusible, insoluble product. An excess amount of silicic acid may be used as a filler.

The amino silicate compounds may also from condensation products with acetones, furans, isocyanates, diisocyanates, epichlorohydrin, dicarboxylic acids and anhydrides, silicones, and may be copolymerized with unsaturated organic compounds.

DESCRIPTION OF THE PREFERRED EMBODIMENTS

The following examples describe in detail certain preferred embodiments of the process of my invention. These preferred processes may, of course, be varied as described above with similar results. Parts and percentages are by weight, unless otherwise indicated.

EXAMPLE I

Forty parts by weight of sodium silicate pentahydrate are added to 200 parts by weight of water, stirred until the sodium silicate goes into solution, then dilute sulfuric acid is added until the pH is 4 to 6, thereby producing silicic acid gel. The silicic acid gel is washed and filtered. The moist silicic acid gel is mixed with 20 parts by weight of urea, heated to 90° to 150° C. for 20 to 60 minutes, until the chemical reaction is substantially complete, at ambient pressure, thereby producing a white, granular compound, urea silicate ($H_2N.CO.NH.SiO.OH$).

The said urea silicate is mixed with an aqueous formaldehyde solution in the ratio of 1:1 mols, heated to 70° to 100° C. while agitating, for 20 to 60 minutes, or until the desired viscosity is reached, thereby producing poly (formaldehyde urea silicate) resin, which is clear in color and may be produced as a thick liquid or as a solid.

The clear liquid of said resin may be used as an adhesive for wood and also may be used as a protective coating for wood. The solid resin may be softened with heat and molded into useful objects. The said resin is soluble in acetic acid and may be used as a varnish or paint to protect wood; it leaves a tough, clear resin on the wood when dry.

EXAMPLE II

Twenty-five parts by weight of silicic acid gel as produced in Example I, that has been air dried at 25° to 50° C., and 20 parts by weight of urea are mixed, heated to above the melting point of urea for 20 to 60 minutes, while agitating, until the chemical reaction is substantially complete, thereby producing urea silicate, a white, granular compound.

The said urea silicate is added to an aqueous solution of formaldehyde in the ratio of 1:1.5 mols, mixed, and the urea silicate goes into solution. The unreacted silicic acid is removed by filtration. About 15% to 25% of the said silicic acid did not chemically react with said urea. To the clear aqueous solution of urea silicate and formaldehyde is added a dilute solution of sulfuric acid until the pH is 4 to 5, then said solution is heated to 70° to 110° C. for 20 to 80 minutes, until the desired viscosity is obtained, thereby producing poly (formaldehyde urea silicate) resin, which is clear in color and may be produced as a thick liquid or as a solid. The said solid resin may be heated to 70° to 80° C. and molded into useful objects.

EXAMPLE III

About one mol of gelatinous orthosilicic acid, one mol of urea and about 0.2 mol of sodium carbonate are mixed, heated to 95° to 150° C. for 20 to 60 minutes, thereby producing white granules of urea silicate.

The urea silicate granules are only slightly soluble in water, but are soluble in warm aqueous solution of formaldehyde. A small portion (15% to 30%) of the said urea silicate is not soluble in an aqueous solution of formaldehyde and appears to be urea disilicate. The urea disilicate will react with an aqueous solution of formaldehyde to produce a clear resin. About 10% to 25% of the said gelatinous orthosilicic acid does not chemically react with the said urea. The said urea silicate decomposes with further heating and ammonia is given off. Urea silicate is soluble in alkali hydroxide solution, dilute sulfuric acid and other solvents.

EXAMPLE IV

One mol by weight of metasilicic acid and one mol by weight of urea are mixed, heated to 95° to 150° C. for 20 to 60 minutes, until the reaction is substantially complete, thereby producing white granules of urea silicate. The said urea silicate is mixed into about one mol of acetoaldehyde in an aqueous solution and the urea silicate goes into solution. The unreacted metasilicic acid is filtered out. About 15% to 25% of said metasilicic acid is filtered out. The urea silicate formaldehyde solution is heated to 70° to 110° C. for 20 to 60 minutes, until the desired viscosity is obtained, thereby producing poly (formaldehyde urea silicate) resin. The resin may be produced as a thick clear resin or a solid, depending on the length of time the resin is heated.

EXAMPLE V

Clay is reacted with sulfuric acid, thereby producing metasilicic acid, which is recovered by filtration. About one mol of said metasilicic acid is mixed with 2 mols of urea, heated to 90° to 150° C. for 20 to 30 minutes, thereby producing white granules of diurea silicate. The said diurea silicate is added to an aqueous solution of hexamethylene tetramine in the ratio of 1:1.5 mols, heated to 70° to 110° C. for 20 to 90 minutes, thereby producing a clear thick solution of poly (formaldehyde diurea silicate) resin, and, upon further heating, a white resin is produced. The said white resin is soluble in acetic acid and produces a clear solution; the unreacted silicic acid is precipitated. The solution of poly (formaldehyde diurea silicate) resin forms a clear tough coating on wood.

EXAMPLE VI

Moist silicic acid gel containing equivalent to about one mol of silicon dioxide with a pH of 6.5 to 8, is mixed with one mol of melamine, heated to 70° to 260° C., while mixing, for 20 to 60 minutes, thereby producing a white, fine, granular compound, melamine silicate. The said melamine silicate is added to about 5 mols for aqueous formaldehyde, heated to 70° to 120° C. for 30 to 90 minutes, the melamine silicate goes into solution; the solution is filtered, and about 5% to 15% of the said silicic acid gel is filtered out. The said solution is heated until the melamine silicate reacts chemically with the formaldehyde to produce white granules of poly (formaldehyde melamine silicate) resin. On further heating, the said resin melts and produces a soft pliable resin.

The poly (formaldehyde melamine silicate) resin has a melting point of 80° to 90° C., is soluble in glacial acetic acid and, when heated with glacial acetic acid, it reacts chemically to produce rubbery, solid resin. Poly (formaldehyde melamine silicate) resin will react chemically with organic acids and anhydrides to produce novel and useful resins. The said resin may be melted and molded into useful objects.

EXAMPLE VII

Moist silicic acid gel containing about 1 mol of silicon dioxide and one mol of malamine are mixed, sodium carbonate is added until the pH is 8 to 10.5, then heated to 70° to 260° C. for 20 to 90 minutes, while agitating, thereby producing fine granules of melamine silicate. The said melamine silicate is added to about 2 mols of aqueous formaldehyde, heated to 70° to 150° for 30 to 120 minutes, while agitating, and the melamine silicate goes into solution. On further heating, a white, soft, granular resin, poly (formaldehyde melamine silicate) is produced.

The said poly (formaldehyde melamine silicate) resin is soluble in acetic acid and may be painted on wood to produce a hard, clear protective coating. The granules of poly (formaldehyde melamine silicate) resin soften or melt at 70° to 90° C. and can be molded into useful objects or coatings, which are resistent to strong acids and alkalis.

EXAMPLE VIII

The said melamine silicate as produced in Example VII is added to about 2 mols of formaldehyde in an aqueous solution and dilute sulfuric acid is added until the pH is 4 to 5.5, then heated to 70° to 100°, while agitating, for 15 to 60 minutes, thereby producing a white, solid resin, poly (formaldehyde melamine silicate). The said resin is not soluble in acetic acid and is resistent to strong acids and alkalis. On heating, the said resin softens very little and is destroyed before it will melt.

EXAMPLE IX

Concentrated sulfuric acid is slowly added to 40 parts by weight of sodium metasilicate pentahydrate granules, while agitating, until the pH is 6.5 to 7.5. The said mixture is washed with water, filtered, thereby producing a mixture of polysilicoformic acid, orthosiliconformic acid, silicoformic acid and metasilicic acid. The said mixture is mixed with 30 parts by weight of melamine then heated to 70° to 260° C. for 20 to 90 minutes, thereby producing white granules of melamine silicoformate and melamine metasilicate.

About 120 parts by weight of a 37% aqueous solution of formaldehyde is added to said granules of melamine silicoformate and melamine metasilicate and then heated to 70° to 120° C., while agitating, for 20 to 120 minutes, thereby producing a white resin, poly (formaldehyde melamine silicoformate and metasilicate). The said resin is soluble in acetic acid, softens with heat, and may be molded into useful objects.

EXAMPLE X

The silicoformic acid, polysilicoformic acid and metasilicic acid as produced in Example IX are mixed with 25 parts by weight of urea, heated to 90° to 150° C., while agitating, for 20 to 90 minutes, until the chemical reaction is substantially complete, thereby producing white granules of urea silicate and urea silicoformate. The said white granules are added to about 100 parts by weight of a 37% aqueous formaldehyde solution, then heated to 70° to 120° C., while agitating, for 20 to 90 minutes, or until the desired viscosity is obtained, thereby producing a poly (urea silicate urea silicoformate formaldehyde) resin, which may be a clear thick liquid or a clear solid.

The said resin is soluble in a glacial acetic acid. About 10% to 20% of the silicic acid is not soluble and may be filtered out. The acetic acid solution of said resin may be painted on wood and forms a hard, clear protective coating.

EXAMPLE XI

The silicoformic acid, polysilicoformic acid and metasilicic acid as produced in Example IX are mixed with 30 parts by weight of thiourea, heated to 70° to 150° C., while agitating, for 15 to 90 minutes, thereby producing white granules of thiourea silicoformate and thiourea silicate. The said thiourea silicate and silicoformate are added to 100 parts by weight of 37% aqueous solution of formaldehyde, heated to 70° to 90° C. and the solution becomes clear. The said solution is filtered and about 10% to 20% of the silicic acid is filtered off. Dilute sulfuric acid is added to said solution until the pH is 4 to 5, and then heated to 70° to 90° C., while agitating, for 20 to 30 minutes, or until the desired viscosity is obtained. The resin is, at first, clear, then, as the viscosity increases, it becomes white, thereby producing poly (formaldehyde thiourea silicate thiourea silicoformate) resin. The said resin is soluble in acetic acid and forms a clear solution. The said white resin has a softening point of 40° to 50° C., depending on its viscosity while heating, and may be molded into useful objects or used as a protective coating agent.

EXAMPLE XII

Moist silicic acid gel containing about 20 parts by weight of metasilicic acid is mixed with 25 parts by weight of dicyandiamide, heated to 70° to 220° C. for 20 to 90 minutes, while stirring, thereby producing a light yellow powder, dicyandiamide silicate. Dicyandiamide silicate is added to aqueous formaldehyde in about equal molar proportions, heated to 70° to 150° C., while agitating, for 25 to 120 minutes, or until the desired viscosity is obtained, thereby producing a clear resin, poly (dicyandiamide silicate), which turns to a creamy color upon cooling. The poly (dicyandiamide silicate) resin is soluble in acetic acid and forms a clear solution with 15% to 25% of the silicic acid settling to the bottom and which may be filtered out. The said resin softens at about 50° to 60° C. and may be molded into useful objects or used as a coating agent on wood.

EXAMPLE XIII

Dicyandiamide silicate as produced in Example XII is added to an aqueous solution of formaldehyde in the ratio of 1:1 mols. Dilute hydrochloric acid is added to the said solution until the pH is 4 to 5. The said mixture is heated to 70° to 100° C. for 20 to 60 minutes, while agitating, thereby producing a white resin poly (formaldehyde dicyandiamide silicate). The said resin softens with heat, is soluble in acetic acid and, when the acetic acid solution of said resin is applied to wood and dries, it leaves a clear protective coat.

EXAMPLE XIV

Concentrated phosphoric acid is added slowly to about 40 parts by weight of sodium metasilicate containing less than 6 mols of water per mol of sodium metasilicate, while agitating to control the temperature, until the pH is about 6.5 to 7.5, thereby producing a mixture of polysilicoformic acid, orthosilicoformic acid, silicoformic acid, metasilicic acid and sodium phosphate. The mixture is washed and filtered to remove the sodium phosphate. The said mixture of silicic acids are mixed with 25 parts by weight of urea and 75 parts by weight of an aqueous solution containing 37% formaldehyde. Sodium hydrogen sulfate is added until the pH is 4 to 5, the said mixture is then heated to 50° to 80° C. for 20 to 50 minutes, while mixing, or until the desired viscosity is obtained. The resin is first clear, then, as the viscosity increases, it becomes white, thereby producing poly (formaldehyde urea silicate urea silicoformate) resin. The said resin is soluble in acetic acid and forms a clear solution, about 10% to 20% of the silicic acid is not soluble and may be filtered out. The acetic acid solution of said resin may be applied to wood and, when dried, produces a clear tough protective coating. The said resin softens with heat at 60° to 70° C. and may be molded into useful objects.

EXAMPLE XV

The mixture of polysilicoformic acid, orthosilicoformic acid, silicoformic acid and metasilicio acid as produced in Example XIV are mixed with 30 parts by weight of melamine and added to 100 parts by weight of an aqueous solution containing about 37% formaldehyde, then diluted sulfuric acid is added until the pH is 4 to 6. The mixture is heated to 70° to 100° C., while agitating; the silicic acids and melamine go into solution, and, in 20 to 60 minutes or until the desired viscosity is obtained, produces a white poly (formaldehyde melamine silicate melamine silicoformate), resin. The said resin softens with heat and may be molded into useful objects. The said resin is soluble in acetic acid and, when applied to wood and dried, it produces a tough clear protective coating.

EXAMPLE XVI

The mixture of polysilicoformic acid, orthosilicoformic acid, silicoformic acid and metasilicic acid as produced in Example IX, 30 parts by weight of dicyandiamide and 100 parts by weight of an aqueous solution containing about 37% formaldehyde are mixed, then acetic acid is added until the pH is 4 to 5. The said mixture is heated to 70° to 100° C., while stirring, for 20 to 60 minutes or until the desired viscosity is obtained, thereby producing white poly (formaldehyde silicate dicyandiamide silicoformate) resin. The said resin is soluble in acetic acid and, when applied to wood and dried, it leaves a clear, hard protective coat. The said resin softens with heat and may be molded into useful objects.

EXAMPLE XVII

The mixture of polysilicoformic acid, orthosilicoformic acid, silicoformic acid and metasilicic acid as produced in Example IX are mixed with 25 parts by weight of urea, then 40 parts by weight of acrolein is added. The pH is adjusted to a pH of 4 to 5 with sodium hydrogen sulfate. The said mixture is then heated to 60° to 80° C. for 20 to 60 minutes, while agitating, thereby producing a light yellow poly (acrolein urea silicate urea silicoformate) resin. The said resin is soluble in acetic acid and may be molded into useful objects by heat and pressure.

EXAMPLE XVIII

The mixture of polysilicoformic acid, orthosilicoformic acid, silcoformic acid and metasilicic acid as produced in Example IX, 30 parts by weight of urea and 40 parts by weight of crotonaldehyde are mixed; the pH is adjusted to a pH of 4 to 5 with dilute hydrochloric acid and the said mixture is heated to 50° to 85° C. for 20 to 60 minutes or until the desired viscosity is obtained, thereby producing light yellow poly (crotonaldehyde urea silicate urea silicoformate) resin. The said resin is soluble in acetic acid and softens with heat. The acetic acid solution of said resin may be used as a protective coating on wood.

EXAMPLE XIX

The mixture of polysilicoformic acid, orthosilicoformic acid, silicoformic acid and metasilicic acid as produced in Example IX, 20 parts by weight of urea and potassium carbonate are added until the pH is 8 to 10, mixed, heated to 90° to 150° C. for 20 to 60 minutes, while stirring, thereby producing a mixture of urea disilicate and urea disilicoformate. About 80 parts by weight of an aqueous solution containing 37% formaldehyde is added to said urea disilicate and urea disilicoformate, heated to 80° to 100° C., while stirring, for 30 to 90 minutes or until the desired viscosity is reached, thereby producing poly (formaldehyde urea disilicate urea disilicoformate) resin.

EXAMPLE XX

Two mols of orthosilicic acid, one mol of urea, and 0.1 mol of sodium carbonate are mixed, heated to just about the melting point of urea, while agitating, for 20 to 60 minutes, thereby producing a white, granular compound, urea disilicate (HO.SiO.NH.CO.NH.SiO.OH).

The said urea disilicate is added to an aqueous solution of formaldehyde, containing about 1.5 mols of formaldehyde, mixed, heated to 70° to 110° C. while agitating for 20 to 90 minutes or until the desired viscosity is obtained, thereby producing poly (formaldehyde urea disilicate) resin.

Although certain specific preferred ingredients and conditions are described in conjunction with the above-detailed description of the invention and Examples, these may be varied and other ingredients may be used, where suitable, with similar results.

Other applications, modifications and ramifications of this invention will occur to those skilled in the art upon reading this disclosure. These are intended to be included within the scope of this invention, as defined in the appended claims.

I claim:

1. The process for the production of poly(aldehyde amino silicate) resinous products by the following steps:
    (a) mixing about 10 parts by weight if silicic acid, weight calculated on the basic of dry silicic acid, and from about 5 to 20 parts by weight of an amino compound selected from the group consisting of urea, thiourea, melamine, aniline, dicyanidiamide, alkyl-substituted ureas and mixtures thereof;
    (b) heating said mixture to a temperature of from about 70° C. to above the melting point, but below the boiling point of the amino compound, for at least 20 minutes; thereby
    (c) producing an amino silicate compound;
    (d) adding an aldehyde to the amino silicate compound in the ratio of 1 to 5 mols to each mol of the amino silicate compound;
    (e) heating said mixture to a temperature of from about 70° C. to 150° C., while agitating for at least about 20 minutes, thereby
    (f) producing a poly(aldehyde amino silicate) resinous product.

2. The method of claim 1, wherein said silicic acid is selected from the group consisting of silicic acid gel, orthosilicic acid, metasilicic acid, polysilicoformic acid, orthosilicoformic acid or mixtures thereof.

3. The method of claim 1, wherein an alkali compound, selected from the group consisting of sodium carbonate, sodium hydroxide, potassium carbonate, sodium silicate and mixtures thereof, 4. The process of claim 1, wherein the aldehyde is selected from the group consisting of acetaldehyde, butyaldehyde, acrolein, and furfural.

* * * * *